United States Patent [19]

Treptow

[11] Patent Number: 4,680,740
[45] Date of Patent: Jul. 14, 1987

[54] AUDIO AID FOR THE BLIND

[76] Inventor: Leonard A. Treptow, 51 Crescent Rd., #104, Greenbelt, Md. 20770

[21] Appl. No.: 906,888

[22] Filed: Sep. 15, 1986

[51] Int. Cl.⁴ .............................................. G01S 15/88
[52] U.S. Cl. ...................................... 367/101; 367/910
[58] Field of Search ....................... 367/101, 102, 910

[56] References Cited

U.S. PATENT DOCUMENTS 3,987,403 10/1976 Smith .................................. 367/102

*Primary Examiner*—Richard A. Farley
*Attorney, Agent, or Firm*—Charles W. Helzer

[57] ABSTRACT

A low cost, effective electronic audio aid for the blind who have good hearing. The aid employs a hand held housing about the size of a flashlight which contains a battery power supply and electronic-audio circuit together with a somewhat directional audio speaker for emitting a low power, directional beam of acoustic energy having specially-shaped audio waveforms which when impinging on an object in the vicinity of the user return an altered, reflected characteristic sound signal which can be audibly discerned by the user to detect the presence of the object and its approximate location.

17 Claims, 3 Drawing Figures

U.S. Patent   Jul. 14, 1987   4,680,740
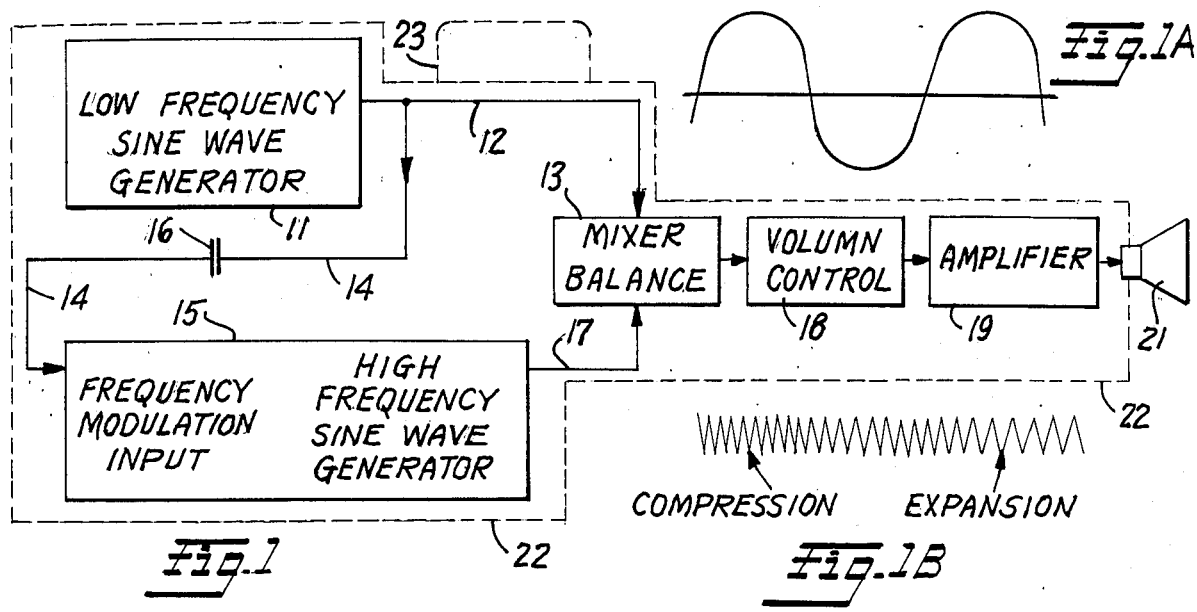
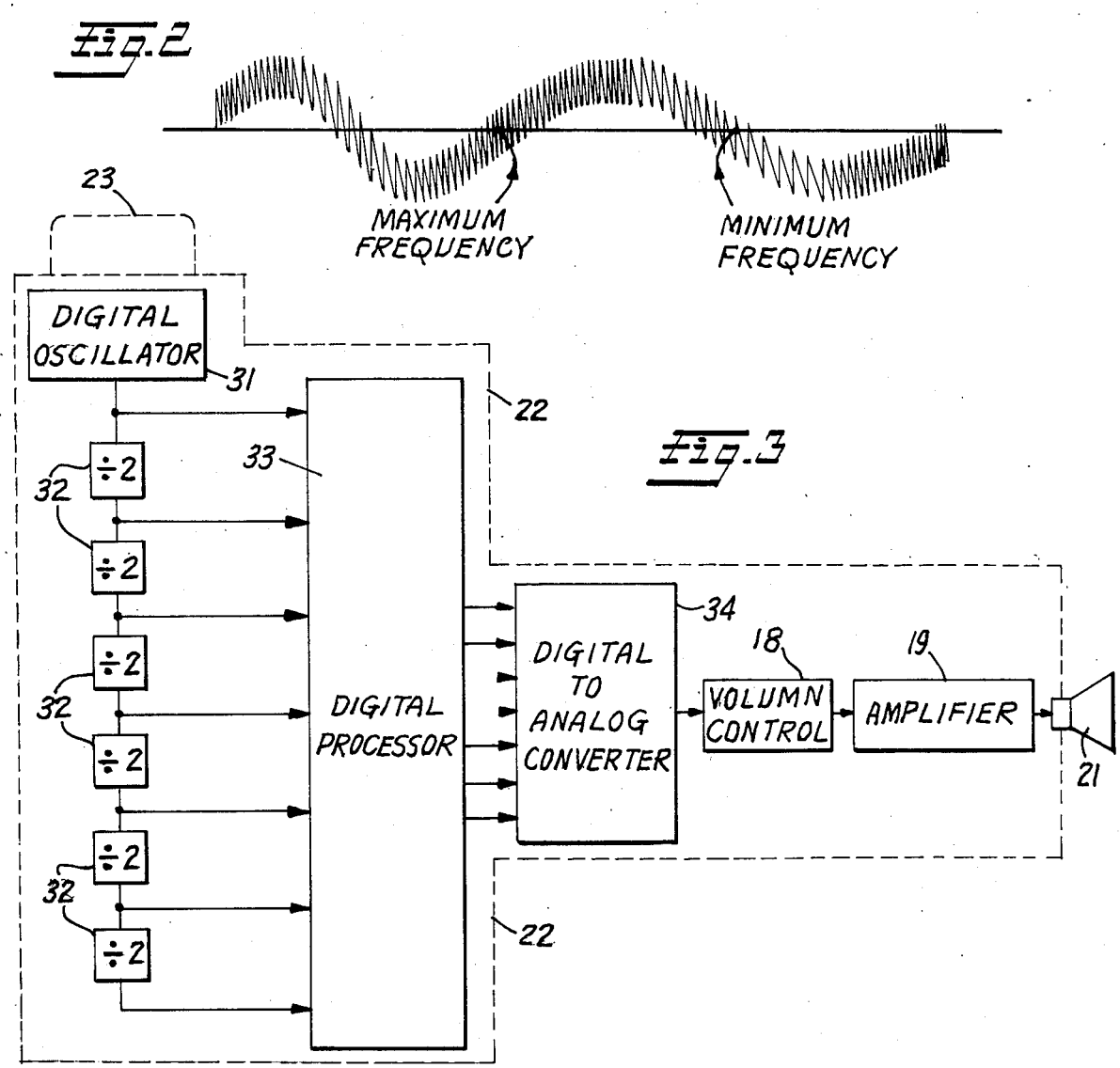

AUDIO AID FOR THE BLIND

FIELD OF INVENTION

This invention relates to an electronic audio aid for the blind.

More particularly, the invention relates to a low cost, effective, electronic audio aid for the blind with good hearing and which employs a hand held, sonic transducer that emits a low power directional beam of sound waves having a specially-shaped waveform which when impinging on an object in the vicinity of the user returns an altered, reflected sound signal which can be audibly discerned by the user.

BACKGROUND PRIOR ART

U.S. Pat. No. 3,987,403 issued Oct. 19, 1976 for "Sensory Aids For The Blind" describes an electronic audio aid in which a frequency swept ultrasonic carrier signal is generated and radiated as acoustic energy from a headset. Reflected acoustic energy is received by two spaced-apart receiving transducers which feed a two channel receiver. The two receiving transducers have divergent polar lobes which in combination with the polar lobe of the transmitting transducer simulate the characteristics of a normal human auditory system. The carrier signal is multiplied with each received signal to produce respective beat frequency signals each of which have a frequency and level which is dependent upon the range and direction respectively of the target source of reflection which respect to the user. The gain of both channels is controlled synchronously by controlling the level of the carrier signal multiplied with each received signal. Range of gain control can be increased by feeding the transmitting transducer with the control level carrier signal.

The sensory system described in U.S. Pat. No. 3,987,403 operates with an ultrasonic carrier and requires a separate transmitting transducer and two separate receiving transducers (one for each ear) in addition to the ultrasonic carrier signal generating circuit for the transmitter and reflected ultrasonic signals returned from the target which must be processed in a receiving channel for each ear, in addition to the converting circuitry for converting the reflected and returned ultrasonic signals in each receiving channel to the audible range in order to be perceived by the user. Thus, the audio aid described in this patent is quite complex and costly, requiring a large number of interrelated parts and components and is difficult to maintain in alignment during operation, thus requiring considerable skill on the part of the user. To overcome these objectional features found in currently available audio aids for the blind, the present invention was devised.

SUMMARY OF INVENTION

It is therefore a primary object of the present invention to provide a novel electronic audio aid for the blind which is simple in construction, low cost, relatively easy to operate, and after the user acquires greater skills through continued experience with the audio aid, it can be of considerable assistance to the blind while moving about in familiar and unfamiliar territory.

Another object of the invention is to provide an electronic audio aid having the above characteristics which readily can be carried by a blind person in his or her hand without undue burden or impairment of his (or her) mobility.

In practicing the invention, a novel method and apparatus for locating different characteristics, objects and landscape features in the environs of blind persons is provided which uses specially formed audio frequency signals emitted by a hand held, directional specially formed audio frequency acoustic signal emitting aid wherein specially formed audio frequency signals are derived by:

generating both a low audio frequency electric signal and a high audio frequency electric signal;

frequency modulating the high audio frequency electric signal with the low audio frequency electric signal;

combining the low audio frequency electric signal with the high audio frequency modulated electric signal to derive an output; and supplying the output low audio frequency carrier electric signal with the superimposed modulated high audio frequency signal to directional electro-acoustic transducer means for converting the specially-formed audio frequency electric signal to the desired specially-formed audio frequency acoustic signal emitted by the hand held aid and used by the blind to locate objects in their path.

In developing the specially-formed audio frequency signal emitted by the hand held aid, the phase of the low audio frequency carrier and the low audio frequency modulated high audio frequency signals are adjusted whereby the maximum frequency compression of the low frequency modulated high frequency audio signal occurs on the rising amplitude slope portion of the low frequency audio carrier wave and the minimum frequency expansions of the low frequency modulated high frequency audio signal occur on the falling amplitude slope portion of the low frequency audio carrier wave. By this means, maximum performance is achieved.

In preferred embodiments of the invention, the mixer means employed to combine the low audio frequency carrier electric signal with the low audio frequency modulated high audio frequency electric signal is adjusted such that the low audio frequency carrier component comprises about 90% of the amplitude of the emitted specially formed audio frequency acoustic signal and the low frequency modulated high audio frequency component comprises about 10% of the emitted specially formed audio frequency acoustic signal for maximum performance.

BRIEF DESCRIPTION OF DRAWINGS

These and other objects, features and many of the attendant advantages of this invention will be appreciated more readily and the same becomes better understood from a reading of the following detailed description, when considered in connection with the accompanying drawings, wherein like parts in each of the several figures are identified by the same reference characters, and wherein:

FIGS. 1A-B are a functional block diagram of an analog form of a low cost audio aid for the blind constructed according to the invention;

FIG. 2 is an amplitude versus time charateristic curve illustrating the nature of the specially formed audio frequency wave emitted by the audio aid system shown in FIG. 1; and FIG. 3 is a simplified functional block diagram of a digital form of the audio aid according to the invention.

BEST MODE OF PRACTICING THE INVENTION

FIG. 1 is a functional block diagram of an anlog form of audio aid constructed according to the invention, and is comprised by a low frequency sine wave generator 11 of conventional, commercially available construction such as the XR-2206 integrated circuit chip manufactured and sold commercially by Exar, Incorporated of Sunnyvale, Calif. Low frequency sine wave generator 11 supplys a low frequency, sinusoidal waveform electric signal having the wave shape shown in FIG. 1A and a frequency ranging between 50 and 250 hertz, but preferably for best results having a frequency of 100 hertz. This low frequency sine wave signal is supplied over a conductor 12 to one input of a mixer balancer circuit 13 and over a second conductor 14 to a modulating input terminal of a high frequency sinusoidal wave generator 15. A phase adjusting capacitor 16 is interconnected in conductor 14 between the output of low frequency generator 11 and the modulation signal input terminal of high frequency sine wave generator 15. High frequency generator 15 also may comprise an XR-2206 integrated circuit chip manufactured and sold by Exar, Incorporated of Sunnyvale, Calif. adjusted to operate within a range from 500 to 10,000 hertz. Generator 15 has its high audio frequency output signal frequency modulated with the low audio frequency signal supplied over conductor 14 to the modulation input terminal of the chip so as to result in a low audio frequency modulted high audio frequency electric output signal having the wave shape characteristics illustrated in FIG. 1B. As noted in Fig. 1B, the resultant frequency modulated high audio frequency output signal from generator 15 will have alternately occuring periods of compression and expansion at the low audio frequency rate. The frequency modulated output signal from generator 15 is supplied over conductor 17 to a second input of mixer balancer circuit 13.

The mixer balancer circuit 13 may comprise a variable resistor having an adjustable center tap point with the low audio frequency sine wave signal supplied from generator 11 applied to one of its end terminals and the frequency modulated high audio frequency signal from generator 15 supplied to its opposite or lower terminal and the output being derived from the adjustable center tap point of the variable resistor. By adjustment of the position of the center tap point of the variable resistor, the relative magnitudes of the low audio frequency sine wave signal which serves as a carrier and the magnitude of the frequency modulated high audio frequency signal supplied from the generator 15 can be controlled to derive a composite output low audio frequency carrier electric signal having the low audio frequency modulated high audio frequency electric signal superimposed thereon. This composite output signal then is supplied through a volume control 18 and driver amplifier 19 to a directional, electro-audio transducer or speaker 21.

Volume control 18 may comprise any commercially available volume control such as those sold by Tandy Radio Shack, the driver amplifier 19 may comprise a LM 2002 integrated circuit chip manufactured and sold commercially by National Semiconductor, and the speaker or transducer 21 may comprise a commercially available audio speaker such as the model number 40-1325 audio speaker sold by Tandy Radio Shack. It should be expressly understood at this point in the description that while the above-noted commercially available components have been identified as suitable for use in applicant's novel audio aid for the blind, other comparable components such as those manufactured by Texas Instruments, National Semiconductor and Intel Corporation readily could be substituted and used in the system. Further, while the functional block diagram of the system illustrated in FIG. 1 has been described as being comprised of hybrid integrated circuit components interconnected together by appropriate conductors such as a printed circuit board, a preferred form of manufacturing the system would be to employ a monolithic integrated circuit chip wherein all components are fabricated on a common substrate in accordance with well known monolithic integrated circuit chip manufacturing techniques.

The components described above of the electronic audio aid are mounted within an outer housing member 22 which is about the size of a flashlight and may be formed from molded plastic. The housing member 22 includes readily grasped handle portion 23 which allows the housing and supported components to be held in the hand of a blind person who is using the aid. The output electro-acoustic transducer speaker 21 is supported within housing member 22 in such a fashion that its output beam of audio energy is not substantially altered or diminished by the size of the housing member. The output beam of acoustic energy emitted by the speaker 21 while it is somewhat directional, is not highly directional, in the form of a pencil-like beam of energy. On the contrary, the beam of acoustic energy is somewhat focused but only within about a 4 to 5 foot radius.

In operation the low audio frequency generator 11 supplies a relatively high amplitude, low frequency of the order of 100 hertz, sinusoidal electric signal to one end of the mixer balancer potentiometer 13. This low frequency signal is also supplied over conductor 14 through phase adjusting capacitor 16 to the modulation input of the high audio frequency sine wave generator 15. Generator 15 as a result produces the low audio frequency modulated high audio frequency wave shape signal illustrated in FIG. 1B and supplies it to the remaining end of the mixer balancer potentiometer 13. The high frequency audio wave is the order of 1000 hertz. In the mixer balancer, proportions of the two signals are adjusted so that the low audio frequency carrier represents about 90% of the amplitude of the audio signal emitted by speaker 21 and the remaining 10% is comprised by the low frequency modulated high audio frequency signal.

The specially shaped electric signal is then supplied through volume control 18 and output driver amplifier 19 to drive the speaker 21. The wave shape of the emitted, specially formed audio frequency signal is illustrated in FIG. 2 of the drawings wherein it is seen that the low audio frequency carrier of about 100 hertz represents the bulk of the amplitude of the transmitted signal. Superimposed on the 100 hertz carrier is the low frequency modulated high audio frequency signal derived from generator 15. An important characteristic feature of the transmitted wave is with regard to the phasing of the high audio frequency signal relative to the low audio frequency with which it is modulated and on which the composite signal is superimposed in mixer balancer 13. The capacitor 16 is adjusted in value so as to assure that the compression periods of the frequency modulated high audio frequency wave at the output of generator 15 occur during the rising amplitude portion of the low audio frequency carrier wave shown in FIG. 1A and the expansion portion of the frequency modulated wave occur during the dropping amplitude portions of the low frequency carrier wave shown in FIG. 2. Useful information can be developed from other phase angles of frequency modulation, the least useful is at compression or expansion at high or low points of low frequency carrier and there is less usefulness when the compression expansion is 180° out of phase with the preferred method.

With the specially formed low audio frequency modulated high audio frequency frequency signal superimposed on a low audio frequency carrier in the manner described above, a blind person using the aid causes the emitted specially-formed audio frequency signal to be beamed in the direction in which he or she is walking or in a direction in which he or she is interested in ascertaining whether an object is present. This is done by wobbling the beam slightly either side to side or up and down or a combination of both as in a circular wobbling motion. The specially-formed audio wave beam because of its nature results in a return reflected audio signal which can be readily heard by the user in both ears and which provides a characteristic Wop-Wop sound which increases in amplitude as one approaches the object reflecting the signal. This is particularly true of corners of building, doorways, on-coming automobiles, etc., which the user is near or approaching. The reflected, returned, Wop-Wop sounding signal changes in both pitch and amplitude when the user increases the frequency of waggling the aid and the closer he gets to the object returning the reflected signal. As a consequence, a user experienced with the aid can walk right up to within inches of a doorway, the corner of a building, a step going either up or down (where it is necessary to waggle the aid in a vertical plane) in such a manner that the user (if he or she is familiar with the territory) knows it is safe to proceed, or alternatively (if it is unfamiliar territory) can reach out to determine what the object is and confirm that it is indeed a building, doorway, a parked (or moving) automobile, etc. The user sweeps an area vertically to find horizontal edges as in the case of stairways and steps, and sweeps horizontally to find vertical edges as in the corner of buildings, doorways, etc. The device also is capable of distinguishing the texture of objects as between walkways and grassed areas which are differentiated in the pitch of the return audio Wop-Wop signal.

The directional and distance measuring enabling characteristics of this audio aid was discovered while studying dopler modulated distortion in speakers. If two sounds are electronically mixed from separate sources, the sound in theory would be different than if both sounds came in through the same microphone. In order to listen to the effect, the inventor decided to greatly increase this distortion to several times its natural value. When he did he discovered that each part of the room in which he was located had a characteristic signature of distortion which resulted in a characteristic returned Wop-Wop reflected signal. The inventor then related this phenomenon to the known characteristics of bats and dolphins who use some form of sound effects for direction and distance finding purposes. The specially formed phase frequency modulated signal emitted by the audio aid comprising the invention is believed to embody this same phenomenon but is several times greater than what bats and porpoises can generate. It is hypothesized, however, that human beings can use the simplified, specially shaped audio wave emitted by the aid to perform some of the tasks which bats and porpoises can accomplish with their acoustic signal emitting capabilities.

FIG. 2 is a functional block diagram of a digital embodiment of an audio aid constructed in accordance with the invention. Here again, the electronic, audio signal producing components are contained within an outer housing 22 having a handle 23 and a somewhat directional audio speaker 21 supported on the housing for emitting the specially formed audio frequency sound signal in a not too finely focused beam similar to the manner described with relation to the FIG. 1 species of the invention. To develop the specially formed audio frequency emitted signal, a digital oscillator 31 is provided which is of conventional, commercially available construction by any one of a number of solid state circuit manufacturers such as Texas Instruments, National Semiconductor, Intel, Motorola, Fairchild and the like. The digital oscillator supplies its output through a series of digital conversion circuits 32 which in the embodiment shown comprise divide by two circuits. The outputs from the digital conversion circuit 32 then are supplied to respective address inputs of a digital read only memory circuit 33 for processing selected low audio frequency and high audio frequency digital signals derived from the data outputs of the memory circuit 34 to achieve the required frequency modulation and superimposition effect achieved with the analog circuit. It does so through the medium of the digital processor by appropriate programming of the memory circuit 34. The resultant output signal derived from the digital processor 33 then is supplied to a digital to analog converter 34 for converting the signal to the same analog form illustrated in FIG. 2 of the drawings. The output carrier low audio frequency wave having the frequency modulated high audio frequency wave superimposed on it then is further supplied through the volume control 18 and output driver amplifier 19 and supplied to the speaker 21 to thereby achieve the desired emission of a specially-formed audio frequency acoustic wave by speaker 21. The emitted specially-formed acoustic wave then is used by the blind person employing the aid in the same manner as described above with relation to the analog embodiment of the invention.

While the invention has been described principally with relation to an audio aid for the blind, it is believed obvious that it also can be used for purposes other than as an aid for the blind. To be particular, where it is desirable to count numbers of objects passing a point during a given period of time, such as cans, bottles, cartons, etc., the audio aid will result in the production of a distinctively different Wop-Wop sound in the presence of an object such as one of those enumerated above in comparison to that received either by a human listener or by an audio pick-up device from background reflections in the absence of such objects. Accordingly, it should be understood that the circuitry described herein the specially formed audio wave acoustic energy signal which it derives can be used broadly for purposes in addition to that as an aid for the blind, and should be so considered.

APPLICABILITY

This invention relates to a consumer article in the form of an audio aid for use by the blind for direction and distance finding purposes in order to locate objects in the vicinity of the blind person. The aid is effective for distances up to 10 or 20 feet and can be used both outdoors and indoors with effectiveness by blind persons skilled in its operation.

Having described one embodiment of a novel, low cost, audio aid for the blind constructed in accordance with the invention, it is believed obvious that other modifications and variation of the invention will be suggested to those skilled in the art in the light of the above teachings. It is therefore to be understood that changes may be made in the particular embodiment of the invention described which are within the full intended scope of the invention as defined by the appended claims.

What is claimed is:

1. A low cost, simplified, audio frequency signal locating system for use by the blind to identify objects in their path comprising:
    means for generating a relatively high amplitude low audio frequency electric signal;
    means for generating a high audio frequency electric signal;
    frequency modulating means for frequency modulating the high audio frequency electric signal with the low audio frequency electric signal to derive a low frequency modulated high audio frequency electric signal;
    mixer means having its input supplied directly with the high amplitude low audio frequency signal and with the low frequency modulated high audio frequency signal for deriving a high amplitude output low audio frequency carrier electric signal having the low frequency modulated high audio frequency electric signal superimposed thereon; and
    directional electro audio transducer means supplied with said high amplitude output low audio frequency carrier electric signal having the low audio frequency modulated high audio frequency electric signal superimposed thereon for deriving a directional audio beam comprised of the low audio frequency modulated high audio frequency wave superimposed on the low frequency high amplitude audio carrier usable by the blind to identify different characteristic objects and changes in physical features of the environs in which they are located.

2. An audio frequency signal locating system according to claim 1 further characterized by phase adjusting means comprising a part of said frequency modulating means for adjusting the phase of the low frequency and high frequency audio electric signals whereby the maximum frequency compressions of the low frequency modulated high frequency audio signal occur on the rising amplitude slope portion of the low frequency audio carrier wave and the minimum frequency expansions of the low frequency modulated high frequency audio signal occur on the falling amplitude slope portion of the low frequency audio carrier wave.

3. An audio frequency locating system according to claim 2 wherein said mixer means is adjustable to provide control of the relative amplitude proportions of the low audio frequency carrier wave and the superimposed low frequency modulated high audio frequency wave.

4. An audio frequency locating system according to claim 3 further including volume control means and driver amplifier means connected in the system intermediate the output of the mixer means and the input to the directional electro-audio transducer means and wherein the electro-audio transducer means comprises a conventional, commercially available audio speaker of a radio or television set.

5. An audio frequency locating system according to claim 1 wherein said means for generating the low and high audio frequency electric signals comprises a digital oscillator and digital conversion circuit means supplied by said digital oscillator for deriving the desired low and high audio frequency signals in digital form; and
    wherein said frequency modulating and mixer means is comprised by a digital memory means for processing the digital low and high frequency signals to derive the output low audio frequency carrier electric signal having the low frequency modulated high audio frequency electric signal superimposed thereon in digital form; and
    digital to analog converter means intercoupled between the output of the digital processor means and the input to the directional electro-audio transducer means.

6. An audio frequency locating system according to claim 5 further including volume control means and driver amplifier means connected in the system intermediate the output of the digital to analog converter means and the input to the directional electro-audio transducer means and wherein the electro-audio transducer means comprises a conventional, commercially available audio speaker of a radio or television set.

7. An audio frequency signal locating system according to claim 1 wherein the components of the system are comprised by miniaturized integrated electric circuit components and the entire system including a battery power supply is contained within a hand held housing about the size of a conventional battery operated flashlight.

8. An audio frequency signal locating system according to claim 4 wherein the components of the system are comprised by miniaturized integrated electric circuit components and the entire system including a battery power supply is contained within a hand held housing about the size of a conventional battery operated flashlight.

9. An audio frequency signal locating system according to claim 6 wherein the components of the system are comprised by miniaturized integrated electric circuit components and the entire system including a battery power supply is contained within a hand held housing about the size of a conventional battery operated flashlight.

10. An audio frequency locating system according to claim 1 wherein the low audio frequency signal is about 100 hertz, the high audio frequency signal is about 1000 hertz, the magnitude of the low audio frequency component of the specially formed output emitted by the transducer is about 90% of the transmitted specially formed audio signal and the magnitude of the low frequency modulated high frequency audio signal component is about 10% of the specially formed audio output signal emitted by the transducer.

11. An audio frequency locating system according to claim 4 wherein the low audio frequency signal is about 100 hertz, the high audio frequency signal is about 1000 hertz, the magnitude of the low audio frequency component of the specially formed output emitted by the transducer is about 90% of the transmitted specially formed audio signal and the magnitude of the low frequency modulated high frequency audio signal component is about 10% of the specially formed audio output signal emitted by the transducer.

12. An audio frequency locating system according to claim 8 wherein the low audio frequency signal is about 100 hertz, the high audio frequency signal is about 1000 hertz, the magnitude of the low audio frequency component of the specially formed output emitted by the transducer is about 90% of the transmitted specially formed audio signal and the magnitude of the low frequency modulated high frequency audio signal component is about 10% of the specially formed audio output signal emitted by the transducer.

13. An audio frequency locating system according to claim 9 wherein the low audio frequency signal is about 100 hertz, the high audio frequency signal is about 1000 hertz, the magnitude of the low audio frequency component of the specially formed output emitted by the transducer is about 90% of the transmitted specially formed audio signal and the magnitude of the low frequency modulated high frequency audio signal component is about 10% of the specially formed audio output signal emitted by the transducer.

14. The method of locating different characteristic objects and landscape features in the environs of blind persons using a specially formed audio frequency signal emitted by a hand held directional, specially formed audio frequency acoustic signal emitting aid wherein the specially formed audio frequency signal is derived by:

generating both a low audio frequency electric signal and a high audio frequency electric signal;

frequency modulating the high audio frequency electric signal with the low audio frequency electric signal to produce a low audio frequency modulated high audio frequency electric signal;

combining the low audio frequency electric signal with the low audio frequency modulated high audio frequency electric signal to derive an output low audio frequency carrier electric signal having the low audio frequency modulated high audio frequency electric signal superimposed thereon; and supplying the output low audio frequency carrier electric signal with superimposed modulated high audio frequency signal to directional electro-acoustic transducer means for converting the specially-formed audio frequency electric signal to the desired specially formed audio frequency acoustic signal emitted by the hand held aid and used by the blind to locate objects.

15. The method of claim 14 wherein the magnitudes of the low and high audio frequency signal components are adjusted such that the low audio frequency carrier component comprises about 90% of the emitted specially formed audio frequency acoustic wave and the low frequency modulated high audio frequency component comprises about 10% of the emitted specially formed audio frequency acoustic wave.

16. The method of claim 14 wherein the low audio frequency electric signal is about 100 hertz and the high audio frequency electric signal is about 1000 hertz.

17. The method of claim 15 wherein the low audio frequency electric signal is about 100 hertz and the high audio frequency electric signal is about 1000 hertz.

* * * * *